United States Patent [19]
Fougea

[11] 3,822,794
[45] July 9, 1974

[54] PLANT FOR FILLING MOLDING CAVITIES ARRANGED IN ONE OR MORE BAYS

[75] Inventor: Edouard Marie Fougea, Paris, France

[73] Assignee: Constructions Edmond Coignet S.A., Paris, France

[22] Filed: Nov. 3, 1972

[21] Appl. No.: 303,599

[52] U.S. Cl............. 214/59 A, 198/126, 214/16 R, 425/258
[51] Int. Cl............................................. B65g 65/32
[58] Field of Search........ 214/16 R, 17 C, 59, 59 A, 214/89, 86 R; 198/88, 89, 101, 126; 425/258, 447

[56] References Cited
UNITED STATES PATENTS
1,697,311   1/1929   Frohman........................... 214/59 A
3,153,486   10/1964  Strnad................................ 214/89

Primary Examiner—Robert G. Sheridan
Attorney, Agent, or Firm—Diller, Brown, Ramik & Wight

[57] ABSTRACT

A plant for filing molding cavities arranged in one or more bays. The plant comprises a framework of beams, a bucket mounted on the framework for horizontal displacement between a cement mixer station and a hopper. The hopper is mounted on a carriage which is displaceable in the same direction as the bucket. A conveyor is mounted on the carriage in alignment with the hopper for delivering concrete from the hopper to the molding cavities. The conveyor extends in a direction perpendicular to the direction of movement of the carriage. The entire conveyor assembly is displaceable along its own longitudinal axis between positions corresponding to the various molding cavities. The downstream end of the conveyor is fitted with a chute for directing concrete into a particular molding cavity. The operator may control the various elements such as the bucket, conveyor and carriage either from a console on the carriage or a control panel situated in the vicinity of the downstream end of the conveyor.

7 Claims, 1 Drawing Figure

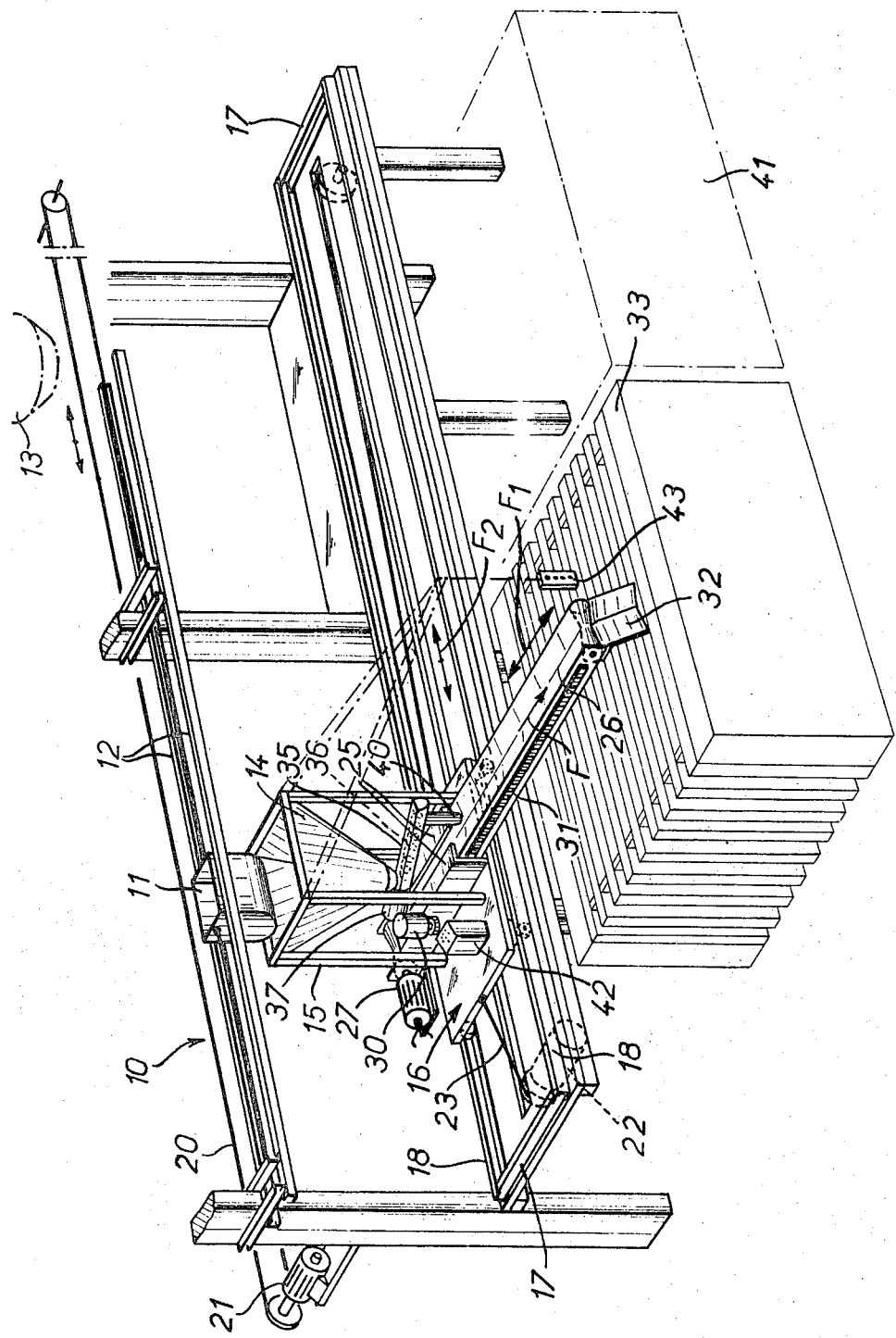

PLANT FOR FILLING MOLDING CAVITIES ARRANGED IN ONE OR MORE BAYS

BACKGROUND OF THE INVENTION

The present invention concerns a device for filling molding cavities for fabrication of construction elements.

In my copending U.S. application, Ser. No. 309,815, filed Nov. 27, 1972, corresponding to French application No. 71 43 664 filed on Dec. 6, 1971, a plant for molding construction elements is described which essentially comprises a framework on which is provided a bay of compartmented partitions, the compartmented partitions are disposed on a fixed support secured to the framework, and a mobile support mounted on the framework for assuring the moving together and separation of the partitions according to the particular manufacturing step.

Such a plant is therefore adapted for mass production of construction elements, but certain other problems such as satisfactory filling of the molding cavities without any dead time still remain.

SUMMARY OF THE INVENTION

An object of the present invention is a plant for the filling of molding cavities which is simple, heavy duty and simple to operate.

The invention consists in a plant comprising in combination, a framework of beams, a horizontally reciprocating bucket mounted for displacement between a mixer station and a hopper carried on a carriage which is displaceable in the same direction as the bucket, the carriage also carrying an endless conveyor in alignment with the hopper which extends horizontally and is oriented perpendicular to the direction of displacement of the bucket and carriage, the said conveyor being movable between forward and rearward positions and adapted to pour concrete in a moldin cavity.

Such a plant has numerous advantages.

In the first place a single worker can control the operation either from a control console situated on a platform on the mobile carriage or a remote-control station with a push-button panel located near the concrete pouring chute.

In the second place the filling of the molding cavities is effected without stoppages and exceptional production rates are obtained.

In the third place, experience shows that with such a plant, the concrete in each molding cavity is distributed more evenly and rapidly owing to the provision of a conveyor with a chute at its end, the conveyor being displaceable to any desired position relative to the cavities.

Another advantage of the mobile conveyor is the fact that because of its mobility it can conveniently pour concrete in all the cavities in a plurality of bays.

BRIEF DESCRIPTION OF THE DRAWINGS

Other features and advantages will be brought in the description which follows given by way of example with reference to the accompanying drawings in which the sole FIGURE illustrates a perspective view of the plant according to the invention.

DESCRIPTION OF A PREFERRED EMBODIMENT

In the illustrated embodiment the plant essentially comprises a framework of beams generally designated by numeral 10, a transfer bucket 11, which is movable along rails 12 between the base of the concrete mixer station 13 shown in dash-dotted lines and the upper end of a hopper 14 which is secured by a support frame 15 to a carriage 16 mounted for displacement between abutments 17 at the end of the rails 18 extending parallel to the rails associated with the transfer bucket 11.

The transfer bucket 11 as well as the carriage carrying the hopper 14 are driven independently of each other by any suitable drive means such as a cable 20 and motor 21 for the bucket and a motor 22 and a cable 23 for the carriage or any other device by independent combinations of electric or hydro-electric motors with speed reducing gear.

The carriage 16 also carries guiding and support means 25 for the conveyor belt 26 arranged on the frame oriented perpendicular to the axis of displacement of the carriage; the conveyor is a conveyor belt which may be driven by a motor 27, the forward direction being indicated by the arrow F.

The frame for the conveyor 26 is rotably mounted along guides 25 by means of a motor 30 in combination with a gear rack for example.

The base of the hopper 14 is provided with a tubular element 35 having a screw 36 driven by an independent motor 37 therein which acts as an extractor and flow control means.

As seen in the drawing the tubular element 35 is inclined relative to a horizontal plane and in part overhangs the conveyor 36 on which the concrete is deposited by a vertical spout 40.

With such a plant it is possible to fill a plurality of molds in a bay such as disclosed in my copending U.S. Pat. application Ser. No. 309,815 filed on Nov. 27, 1972 entitled "Plant for Molding Construction Elements."

It is understood that the chute 32 may be brought in position above any of the molding cavities from front to back in the direction of the arrow F1 by means of a pinion and toothed rack mechanism or along the opening of each of the molding cavities by the displacement of the carriage 16 in the direction of the arrow F2.

The transfer bucket 11 is movable in the direction of the arrow F3 to reciprocate between the concrete mixer station 13 and the top end of the hopper 14 which enables the storage of a large enough quantities of concrete to assure the continuous feeding of the bay of molding cavities irrespective of the discontinuous nature of the transfer bucket operation.

In the drawing a single bay of molding cavities is shown, a second bay 41 represented in dash-dotted lines may be provided along side the first and treated by the plant.

A control console 42 installed on the carriage 16 or a push-button control panel 43 suspended near the chute 32 will enable various maneuvres while permitting the operator to keep watch over the filling of the molds.

The invention is, of course, not limited to the illustrated embodiment but on the contrary includes all modifications, variations and alternatives within the scope the appended claims.

What I claim is:

1. A plant for filling a plurality of molding cavities arranged in a bay comprising, in combination, a framework, a mixer station operatively associated with said framework, a hopper, a bucket, means mounting said bucket on said framework for horizontal reciprocation relative to said framework between said mixer station and said hopper for delivering a mixed filling material to said hopper, a carriage carrying said hopper, said carriage being supported by said framework and being displaceable relative to said framework in a direction parallel to the direction of movement of said bucket, a conveyor mounted on said carriage in alignment with said hopper for receiving a mixed filling material from said hopper, said conveyor having a longitudinal axis extending perpendicular to the direction of movement of said carriage, means mounting said conveyor on said carriage for movement between forward and rearward positions along its longitudinal axis relative to said carriage, and means associated with the conveyor for pouring a mixed filling material into molds.

2. A plant according to claim 1, wherein said means mounting said conveyor includes a frame slidably mounted on the carriage, and said conveyor being mounted on said frame for said movement between said forward and rearward positions.

3. A plant according to claim 2, further comprising a control console coupled to said carriage, conveyor and bucket for controling the operation of said carriage, conveyor and bucket.

4. A plant according to claim 3, further comprising a remote control station coupled to said carriage, conveyor and bucket for controlling the operation of said carriage, conveyor and bucket.

5. A plant according to claim 1, further comprising a motor means for driving the conveyor.

6. A plant according to claim 5, further comprising motorized rack and pinion means coupled between said carriage and said frame for axially displacing said conveyor relative to said carriage.

7. A plant according to claim 1, wherein said means for pouring the mixed filling material comprises a chute disposed at the end of the conveyor.

* * * * *

UNITED STATES PATENT OFFICE
CERTIFICATE OF CORRECTION

Patent No. 3,822,794            Dated July 9, 1974

Inventor(s) Edouard Marie Fougea

It is certified that error appears in the above-identified patent and that said Letters Patent are hereby corrected as shown below:

On the Abstract Page, after "Appl. No.: 303,599" insert the following:
-- FOREIGN APPLICATION PRIORITY DATA Mar. 27, 1972, France...72 10 600/72 --.

Signed and sealed this 15th day of July 1975.

(SEAL)
Attest:

RUTH C. MASON
Attesting Officer

C. MARSHALL DANN
Commissioner of Patents
and Trademarks